United States Patent
Koitabashi et al.

(10) Patent No.: US 8,565,087 B2
(45) Date of Patent: Oct. 22, 2013

(54) APPARATUS HAVING PACKET ALLOCATION FUNCTION AND PACKET ALLOCATION METHOD

(75) Inventors: Kumi Koitabashi, Funabashi (JP); Takuji Kawai, Ebina (JP)

(73) Assignee: Hitachi, Ltd., Tokyo (JP)

( * ) Notice: Subject to any disclaimer, the term of this patent is extended or adjusted under 35 U.S.C. 154(b) by 247 days.

(21) Appl. No.: 12/869,100

(22) Filed: Aug. 26, 2010

(65) Prior Publication Data

US 2011/0110248 A1  May 12, 2011

(30) Foreign Application Priority Data

Nov. 12, 2009 (JP) ................................. 2009-258497

(51) Int. Cl.
 *H04L 12/26* (2006.01)
(52) U.S. Cl.
 USPC ............ 370/234; 370/230; 370/232; 370/468
(58) Field of Classification Search
 None
 See application file for complete search history.

(56) References Cited

U.S. PATENT DOCUMENTS

| | | | | |
|---|---|---|---|---|
| 7,376,084 B2 * | 5/2008 | Raghunath et al. | ........... | 370/233 |
| 2003/0012196 A1 * | 1/2003 | Ramakrishnan | .............. | 370/390 |
| 2003/0076849 A1 * | 4/2003 | Morgan et al. | ................ | 370/412 |
| 2005/0276263 A1 | 12/2005 | Suetsugu et al. | | |
| 2008/0037544 A1 | 2/2008 | Yano et al. | | |
| 2009/0052454 A1 * | 2/2009 | Pourcher et al. | .............. | 370/392 |
| 2011/0265109 A1 * | 10/2011 | Goyet et al. | ...................... | 725/9 |

FOREIGN PATENT DOCUMENTS

| | | |
|---|---|---|
| JP | 2006-5437 | 1/2006 |
| JP | 2008-048010 | 2/2008 |
| JP | 2008-166881 | 7/2008 |

OTHER PUBLICATIONS

IEEE Standard for Local and metropolitan area networks—Link Aggregation, IEEE802.1AX, Nov. 3, 2008, New York 1001-5997 USA.

JP Office Action for Japanese Patent Application No. 2009-258497, issued on Jan. 22, 2013.

* cited by examiner

*Primary Examiner* — Donald Mills
(74) *Attorney, Agent, or Firm* — Antonelli, Terry, Stout & Kraus, LLP.

(57) ABSTRACT

An allocation execution determiner finds a bias in flow bandwidths allocated to each of physical ports on the basis of a maximum flow bandwidth and an average flow bandwidth reflecting actual traffics, determines high and low in the flow bandwidths, and allocates traffics in such a manner that the traffics become averaged.

6 Claims, 10 Drawing Sheets

FIG.2
PRIOR ART

INDIVIDUAL PORT-NUMBER DATA TRANSFER STATISTICAL TABLE (PRIOR ART) 202

| LOGICAL PORT NUMBER | VLAN IDENTIFIER | OUTPUT PORT NUMBER | DATA SIZE | PACKETS COUNT | DISCARD PACKETS COUNT |
|---|---|---|---|---|---|
| 1 | 32 | 1 | 402312 | 2200 | 8 |
| 1 | 36 | 2 | 194832 | 7211 | 3 |
| 1 | 40 | 3 | 84753 | 3402 | 2 |
| 1 IN TOTAL | — | — | 681897 | 12813 | 13 |
| 2 | 32 | 1 | . | . | . |
| 2 | 36 | 2 | . | . | . |
| 2 IN TOTAL | — | — | . | . | . |
| 3 | 32 | 3 | . | . | . |
| . | . | . | . | . | . |
| . | . | . | . | . | . |

FIG.9

ALLOCATING METHOD        901

| ALLOCATION COUNTER | PORT 1 | PORT 2 | PORT 3 | PORT 4 |
|---|---|---|---|---|
| 0 | 1<br>5<br>9<br>13 | 2<br>6<br>10<br>14 | 3<br>7<br>11<br>15 | 4<br>8<br>12 |
| 1 | 1<br>8<br>9 | 2<br>7<br>10<br>15 | 3<br>6<br>11<br>14 | 4<br>5<br>12<br>13 |
| 2 | 1<br>8<br>11<br>14 | 2<br>5<br>12<br>15 | 3<br>6<br>9 | 4<br>7<br>10<br>13 |
| 3 | 1<br>2<br>15 | 3<br>4<br>13<br>14 | 5<br>6<br>11<br>12 | 7<br>8<br>9<br>10 |
| 4 | 1<br>6<br>11 | 2<br>7<br>12 | 3<br>8<br>13 | 4<br>5<br>9<br>10<br>14<br>15 |
| 5 | 1<br>6<br>11 | 2<br>7<br>12 | 3<br>5<br>8<br>10<br>13<br>15 | 4<br>9<br>14 |
| 6 | 1<br>6<br>11 | 2<br>5<br>7<br>10<br>12<br>15 | 3<br>8<br>13 | 4<br>9<br>14 |
| 7 | 1<br>5<br>6<br>10<br>11<br>15 | 2<br>7<br>12 | 3<br>8<br>13 | 4<br>9<br>14 |

APPARATUS HAVING PACKET ALLOCATION FUNCTION AND PACKET ALLOCATION METHOD

INCORPORATION BY REFERENCE

The present application claims priority from Japanese application JP2009-258497 filed on Nov. 12, 2009, the content of which is hereby incorporated by reference into this application.

BACKGROUND OF THE INVENTION

The present invention relates to apparatuses which has a function of allocating packets using such a technique as to logically combining a plurality of physical lines connected between apparatuses and to treat the physical lines as if they were a single line and packet allocation methods used for the apparatuses, and more particularly, relates to an apparatus which has a function of distributing or allocating packets in two steps of autonomously and beforehand avoiding a bandwidth overflow and effectively and suitably making the most of an excessive bandwidth in business fields of handling various sorts and types of traffics and also to a packet allocation method used for the apparatus.

Due to spread Internet use, improved CPU performances of personal computers, and appearance of multimedia personal computers; delivery of voice and video signals is widely employed in addition to transfer of text data in a packet transfer network. For the delivery of voice and video signals, it is required to suppress packet discard more severely than the text data. Thus it is necessary to avoid such packet discard.

A prior art packet transfer apparatus employing such a technique as to combining a plurality of physical ports into a logical port and treating the ports as the logical port, performs calculating operation on the basis of information (e.g., MAC address, IP address, port number, and VLAN identifier) in packets, selects output one of the physical ports based on the calculation result, and distributes the traffics to the selected output port.

However, there occurs a bias in the value of the calculation result based on the information within the packets. Thus when such packets are distributed as they are, the traffics are concentrated on a specific port and therefore efficient packet transfer cannot be achieved, since flow bandwidths in the physical ports in the local port are not averaged.

To avoid this, there is suggested a method of allocating nearly a uniform bandwidth to a plurality of physical ports in a logical port as a link aggregation (refer to JP-A-2006-5437). The link aggregation is a technique defined in IEEE802.1AX.

According to the method cited in JP-A-2006-5437, a data transfer apparatus as a traffic distribution control apparatus allocates traffics to a plurality of physical ports provided in a logical port as a link aggregation. To this end, the data transfer apparatus calculates a hash value for a received packet using a hash function on the basis of a transmission destination address and a transmission originator address of the received packet, and determines one of the physical ports as a destination. The data transfer apparatus includes a means for calculating a flow ratio between the plurality of physical ports, and a control means for changing allocation of the number of hash values to determine destination physical ports by feeding the calculated flow ratio back to bandwidth distribution or allocation ratios between the plurality of physical ports.

In the apparatus disclosed in JP-A-2006-5437, when a logic specified for determining the destination physical ports is not suitable, a bias probably occurs in the flow bandwidths allocated to the physical ports in the link aggregation. Even when such biased distribution or allocation is executed, it is not judged whether or not the determination is correct. At this time, a large quantity of packets flow. And when the packet quantity exceeds a total of flow bandwidths in the physical ports, this causes occurrence of a packet discard.

In order to solve the aforementioned problem, there are suggested a link aggregation circuit which can automatically select allocation logics according to a change in the property of a network and also a link aggregation allocation method used for the link aggregation circuit (refer to JP-A-2008-166881).

According to the method disclosed in JP-A-2008-166881, the link aggregation circuit using layer 2 for use of link aggregation has a plurality of ports for the link aggregation, a control means for automatically optimizing a MAC allocation logic, and a means for allocating flow-in packets to a plurality of ports based on the optimized MAC allocation logic.

However, the allocation logic optimizing method used in JP-A-2008-166881 is allocation based on a MAC address, and allocation based on packet-in information other than the MAC address is not carried out.

In the prior art packet transfer apparatus using such a technique as to combine a plurality of physical ports into a logical port and to handle the physical ports as the logical port, when flow bandwidths become unbalanced more or less or when a suitable packet distribution or allocation logic is not specified, a bias occurs in the flow bandwidths allocated to the physical ports. Under such a condition, when a large quantity of packets flows and the packet quantity exceeds a total of flow bandwidths of the physical ports, even presence of an excessive bandwidth in the other logically-combined physical ports will cause occurrence of a packet discard.

In recent years, an administrator or operator monitors flow bandwidths at all times, and when a bandwidth overflow is predicted, the operator manually adds a new line and changes output ports for packet flow. This may probably involve an error caused by the manual operation whenever the change is carried out.

SUMMARY OF THE INVENTION

It is an object of the present invention to provide a technique for combining a plurality of physical ports into a single logical port and handling the physical ports as if the physical ports were a single logical line, wherein, when it is desired to select output ones of the physical ports on the basis of any identifier in packets and to transfer packets to the selected physical ports, packet allocation is autonomously carried out in two steps while reflecting actual traffics, thus solving the aforementioned two problems. In this way, since averaged packets as a whole are made to flow, an excessive bandwidth is effectively used, thus avoiding a packet discard.

In accordance with an aspect of the present invention, there is provided a network transfer apparatus which includes a bandwidth monitor for monitoring traffics for each of physical ports of the network transfer apparatus combined into a logical port; a allocation execution determiner for determining whether or not the monitored traffics exceeds a predetermined threshold for the bandwidths of the physical ports; a division executor for again allocating the traffics of the physical ports in the logical port; and a allocation result determiner for determining whether or not the traffics of the physical ports after the allocation by the division executor is smaller than the predetermined threshold.

In the network transfer apparatus, the allocation execution determiner determines whether or not the monitored traffics is larger than the predetermined threshold. When the monitored traffics is larger than the predetermined threshold, the division executor allocates the monitored traffics. When the allocation result determiner determines that the traffics of the physical ports after the allocation exceeds the predetermined threshold, the division executor again allocates the traffics.

In the aspect of the invention, when a bias occurs in flow bandwidths allocated to the physical ports of the logical port and a total maximum of the flow bandwidths of the physical ports exceeds a threshold specified by an administrator or operator, the operator divides the magnitudes of the flow bandwidths according to a previously specified threshold, one of the traffics having a larger flow bandwidth is extracted and allocated to obtain averaged distribution or allocation, and thereafter, the remaining traffics are allocated. As a result, the traffics are averaged as a whole and such packet allocation as to prevent packet discard can be autonomously achieved. Thus the bandwidths of all the physical ports in the logical port can be effectively utilized while eliminating the need for the operator to always monitor the flow bandwidths.

Since packet allocation can be autonomously optimized in the present invention, the need for the operator to manually optimize it whenever a bias occurs in the flow bandwidths allocated to the physical ports can be eliminated, and an error involved by the manual optimization can be prevented. Thus such a highly reliable service as to stop communication stoppage caused by the changing operation or erroneous operation can be provided.

Other objects, features and advantages of the invention will become apparent from the following description of the embodiments of the invention taken in conjunction with the accompanying drawings.

BRIEF DESCRIPTION OF THE DRAWINGS

FIG. 2 shows an example of a statistical table in a packet transfer apparatus as a prior art;

FIG. 9 shows an example of a division method memory table having division methods recorded therein to be executed by an allocator in FIG. 3.

DETAILED DESCRIPTION OF THE INVENTION

The invention will be briefly explained. As first one of features of the invention, a packet transfer apparatus of the invention using a logical port obtained by combining a plurality of physical ports as in a link aggregation is featured in that, when a bias occurs in traffics for each of the physical ports of the logical port, the apparatus again divides or allocates the traffics to correct the bias.

As second one of the features, since traffics flow through the logical port of a virtual LAN called a VLAN, the apparatus monitors traffics for each VLAN and divides or allocates the traffics into the respective physical ports.

Third one of the features will be explained. Many VLANs may be accommodated within each logical port. Thus, at this time, upon traffic re-allocation, re-allocation of all the VLANs to the respective physical ports causes a large load to be applied to the packet transfer apparatus. To avoid this, the load of the entire apparatus is reduced by applying the re-allocation only to physical ports having large traffic average flow bandwidths, in particular, in a predetermined time. The average flow bandwidth used in the explanation of the present invention means an amount of an average traffic data flow in a certain constant time. For example, assume that a VLAN has an average flow bandwidth of 600 Mbps. Then this means that data of average 600 Mbit per second flows in the VLAN (or the VLAN has such an amount of traffic).

Fourth one of the features is that the apparatus confirms whether or not traffics of each physical port after allocation are smaller than a predetermined threshold. When the traffics are larger than the predetermined threshold, the apparatus performs its traffic re-allocation. This means that traffic allocation based on a predetermined algorithm or the like is not always evenly carried out, and thus a determining process is provided after the allocation.

Figure 1:
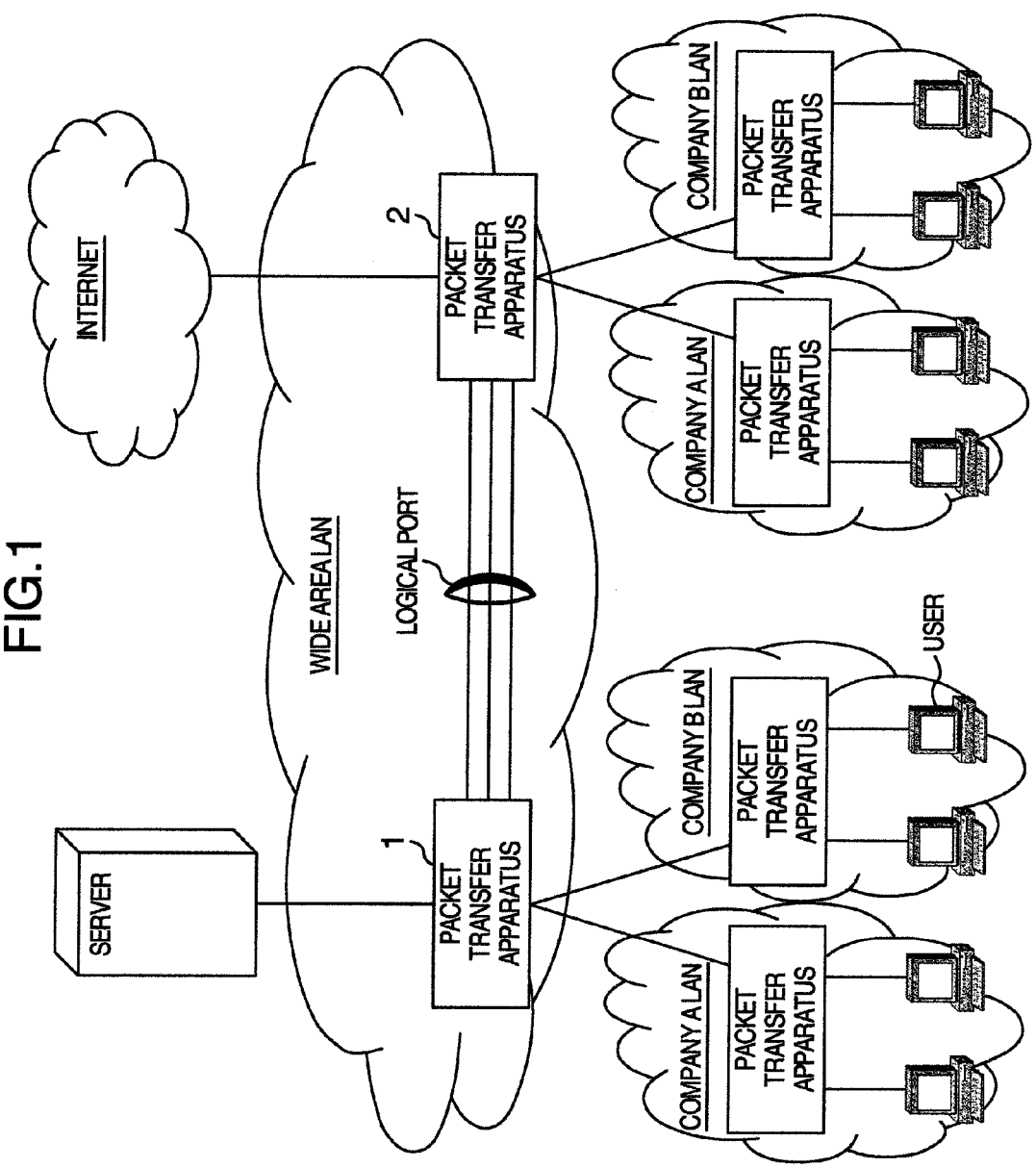
FIG. 1 is a block diagram of an exemplary arrangement of networks to which a packet transfer apparatus in accordance with an embodiment of the present invention is applied.

Explanation will be made as to an embodiment of the present invention by referring to the accompanying drawings. FIG. 1 is a block diagram of a configuration of networks to which a two-step packet allocation method of the present invention is applied.

A packet transfer apparatus 1 or 2 may employ a technique for virtually combining a plurality of physical lines connected with adjacent apparatuses into a logical line and handling the physical lines as if the physical lines were a single line such as link aggregation. In this case, parallel communication is carried out with the adjacent apparatuses and a total of bandwidths of the combined physical ports can be used. When a trouble takes place in any of the plurality of physical lines, the communication can be continued using the other lines. Accordingly, bandwidth expansion with the adjacent apparatuses and redundancy can be secured.

Figure 3:
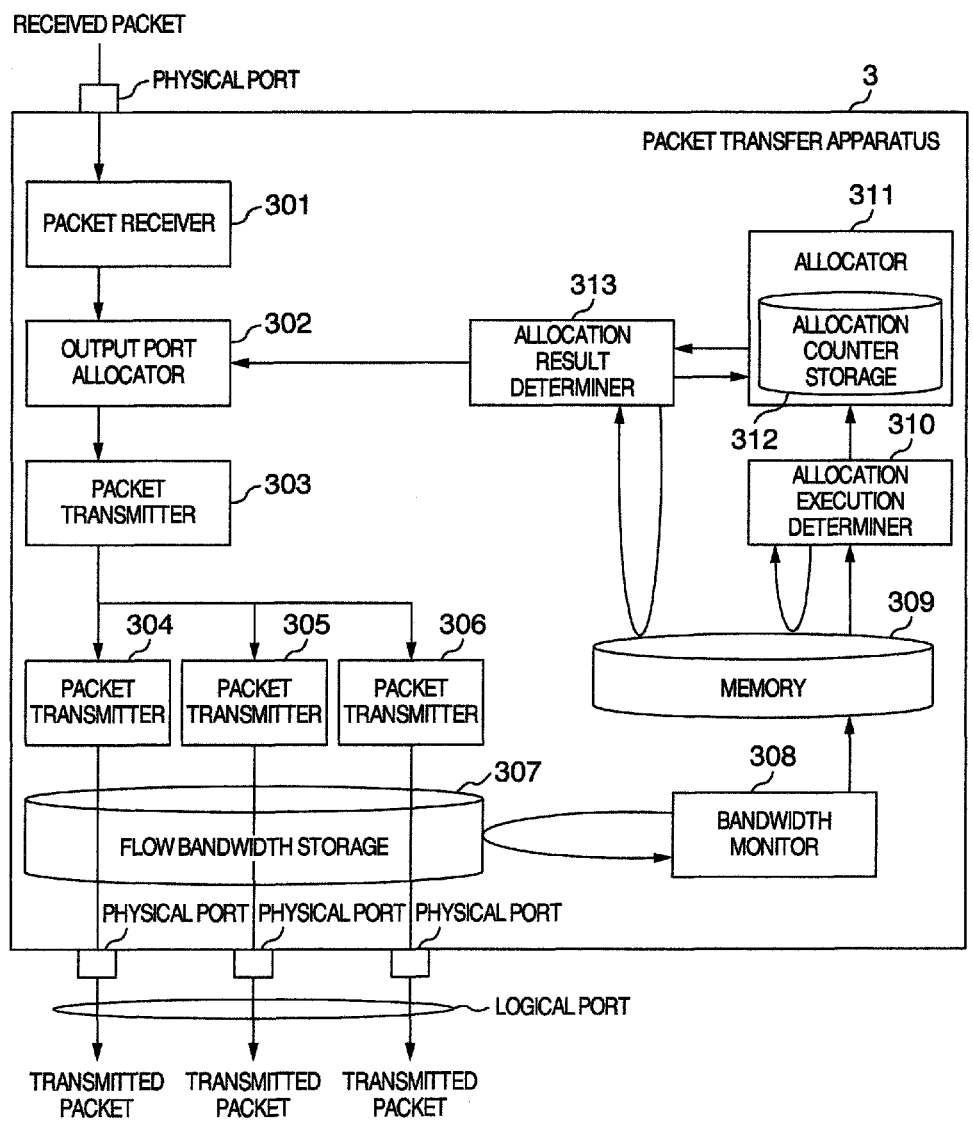
FIG. 3 is a block diagram of an arrangement of a packet transfer apparatus in accordance with the embodiment of the invention.

FIG. 3 is a block diagram of an arrangement of a packet transfer apparatus which employs the two-step packet allocation method of the present invention. In FIG. 3, a packet transfer apparatus 3 includes a packet receiver 301, an output port allocator 302, a packet transferer 303, packet transmitters 304, 305, 306, a flow bandwidth storage 307, a bandwidth monitor 308, a memory 309, a allocation execution determiner 310, an allocator 311, a allocation counter storage 312, and a allocation result determiner 313.

The plurality of packet transmitters 304, 305, 306 are combined into a single logical line as a logical port. However, a combination of combining physical ports may be made not only for ports within the same packet allocation apparatus but also for ports extended within adjacent apparatuses.

The packet receiver 301, when receiving a packet, stores the received port therein and passes the packet to the output port allocator 302. The output port allocator 302 reads an identifier allocated to each VLAN, performs calculation on the basis of configuration and status information set in the packet transfer apparatus and information on ports not receiving the packet within the same VLAN, allocates the packet to an optimum port, and then passes the packet to the packet transferer 303 in such a manner that any of the packet transmitters 304, 305, 306 transmits the packet. The flow bandwidth storage 307 always monitors the flow bandwidth of the output port when the packet is transmitted and stores the monitored information, for example, in such a form as shown in FIG. 2. FIG. 2 shows an individual logical-port-No data transmission/reception statistical table having information about a VLAN identifier, an output port, transmission packets count, a discard packets count recorded therein. Such information may be stored in the flow bandwidth storage 307 or may be stored in the respective bandwidth monitors of apparatuses. Information of FIG. 2 is used for preparing such a table of FIG. 5 as to be explained later.

The apparatus of FIG. 3 is arranged so that, in order to obtain a high transfer performance, the apparatus performs calculation and port allocation and then transfers the packet to the associated port. However, the apparatus may be arranged so that the apparatus transfers the packet to a port not receiving any packet and then performs calculation then transfers the packet from the output port.

Although transmission packet allocation is carried out for each identifier allocated to each VLAN, the allocation may be carried out with use of any of information (such as MAC address, IP address and port number) within the packet.

The bandwidth monitor 308 refers to information in the flow bandwidth storage 307; calculates, at intervals of a constant time, a maximum flow bandwidth, an average flow bandwidth, and a total bandwidth for each identifier and output port within the packet associated with a logical port number upon transmission; and stores its calculation result in the memory 309. In this connection, "constant time" at the intervals is assumed to be a momentary time unit for the maximum flow bandwidth and be a sufficient time unit for the average flow bandwidth, and be rearranged in a descending order of average flow bandwidth each time the average flow bandwidth is updated. The rearranged data will be detailed later.

Figure 4:
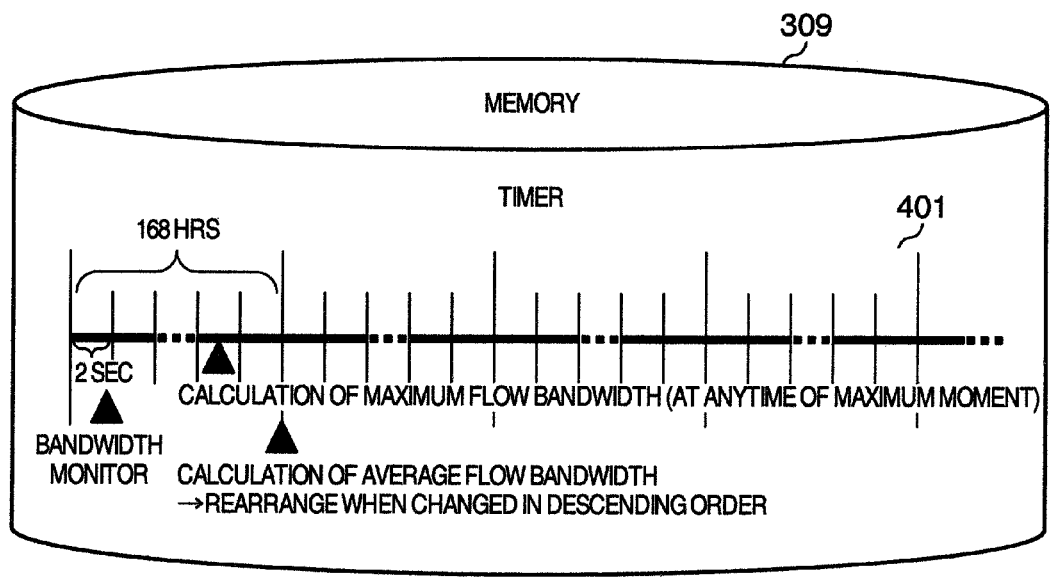
FIG. 4 shows an example of a timer held in a memory in FIG. 3.

FIG. 4 shows an example of timing when timer 401 held in the memory 309 updates the maximum flow bandwidth and the average flow bandwidth. For example, the timer stores information when the bandwidth monitor 308 refers to the flow bandwidth storage 307 at intervals of 2 seconds, and calculates a average flow bandwidth and a total flow bandwidth at intervals of 168 hours. When a variation occurs in the calculation result, the timer rearranges such flow bandwidths in a descending order of average flow bandwidth and perform updating operation. Calculation of the maximum flow bandwidth and the total maximum flow bandwidth is carried out at timing point of detecting the maximum flow bandwidth during the referring operation. In this connection, the timer 401 may be implemented in the form of a program stored in the memory or in the form of hardware.

The allocation execution determiner 310 monitors information in the memory 309 at all times and determines whether or not to execute allocation. The allocator 311 allocates traffics of a VLAN having a high average flow bandwidth by such a method of allocating traffics according to a allocation counter value.

As a method of selecting VLANs having high average flow bandwidths, one of VLANs having one of the high average flow bandwidths numbered by a predetermined number from the highest average flow bandwidth may be selected, or upper ones of the VLANs having flow bandwidths which occupy several percentages or more of the total flow bandwidth of the logical port may be selected. Other selecting means may be allowed, as a matter of course.

Allocation result determiner 313 refers to information in the memory 309 and determines whether or not the allocated result is correct. When it is determined that the allocated result is correct, the output port allocator 302 calculates the remaining traffics and allocates them to an optimum port. When it is determined that the allocated result is not correct, "1" is added to the allocation counter value and the allocator 311 again performs allocation according to the allocation counter value.

Figure 5:
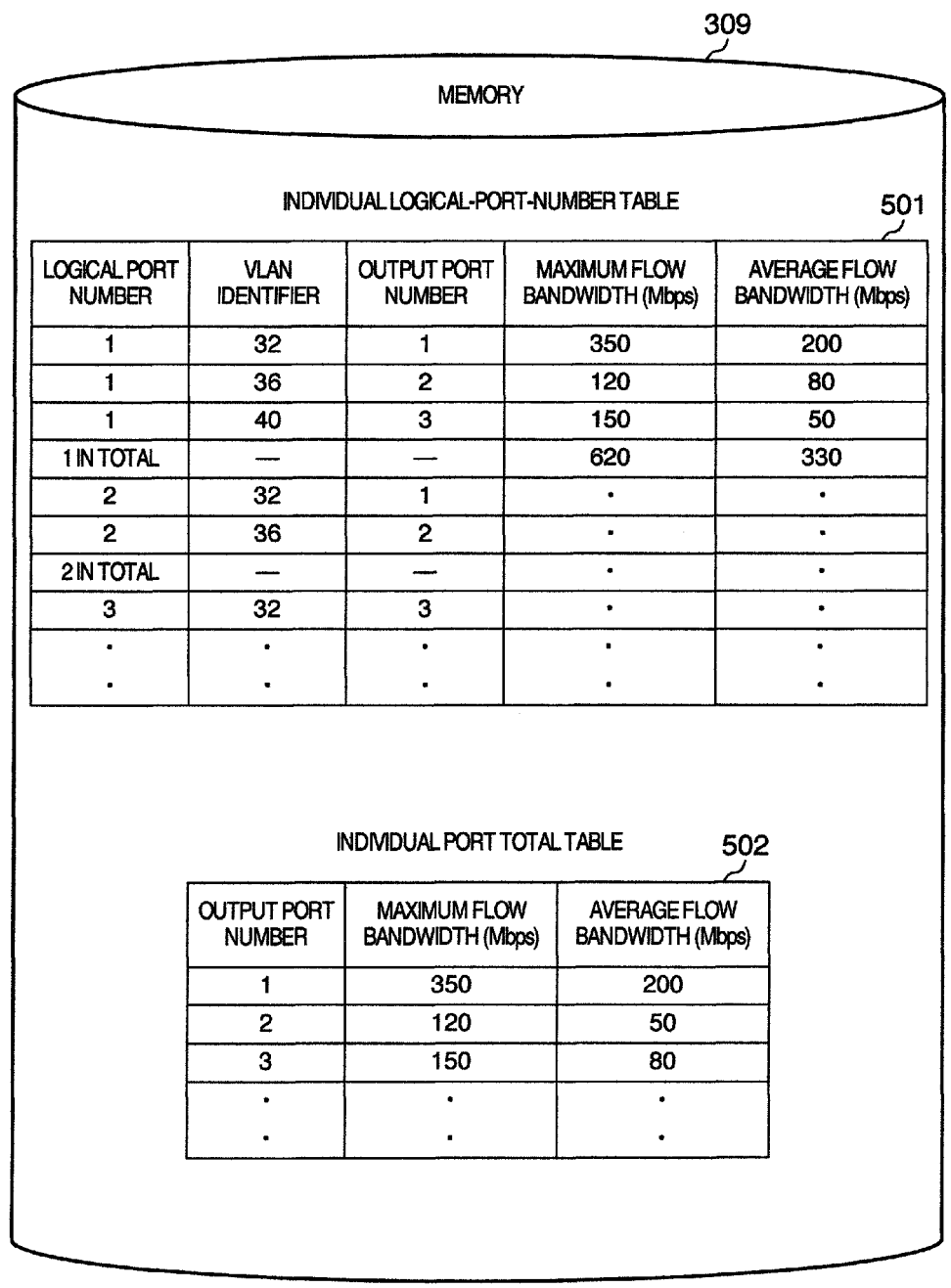
FIG. 5 shows an example of a data structure of the memory of FIG. 3.

Explanation will next be made as to the data structure of the memory 309. FIG. 5 shows an example of a data structure of the memory 309. In FIG. 5, the memory 309 includes two types of tables, that is, an individual logical-port-number table (table 501) having a maximum flow bandwidth, a maximum flow bandwidth, and a total average flow bandwidth for each VLAN identifier and each output port, calculated by the bandwidth monitor 308 and associated with a logical port number; and an individual port total table (table 502) having a total maximum flow bandwidth and a total average flow bandwidth for each output port.

The tables 501, 502 of FIG. 5 are prepared on the basis of information of the individual logical-port-No data transmission/reception statistical table of FIG. 2. In this connection, although the output port is determined in units of VLAN identifier in the present embodiment, the output port may be determined in units of IP address, MAC address or the like.

The table 501 has an logical port number, a VLAN identifier, an output port number, a maximum flow bandwidth, an average flow bandwidth, a total maximum flow bandwidth and a total average flow bandwidth for each logical port. In the present embodiment, the logical port number is set at "1", the output port number is set at "1" for a traffic when the VLAN identifier is "32", the maximum flow bandwidth is set at 350 Mbps, and the average flow bandwidth is set at 200 Mbps.

The table 502 has a total maximum flow bandwidth and a total average flow bandwidth associated with an output port number.

Rearrangement of the average flow bandwidths and calculation of the maximum flow bandwidth and the total maximum flow bandwidth with use of the timer of FIG. 4 are carried out by updating data of the table 501. More specifically, in the table 501, data are sorted in a descending order of average flow bandwidths for each of VLANs belonging to the same logical port. In FIG. 5, for example, when attention is directed to a record of a logical port number "1", it will be seen from the drawing that data are sorted in an order of average flow bandwidth such as "200", "80" and "30", that is, in a descending order. The same holds true even for another logical port.

Figure 6:
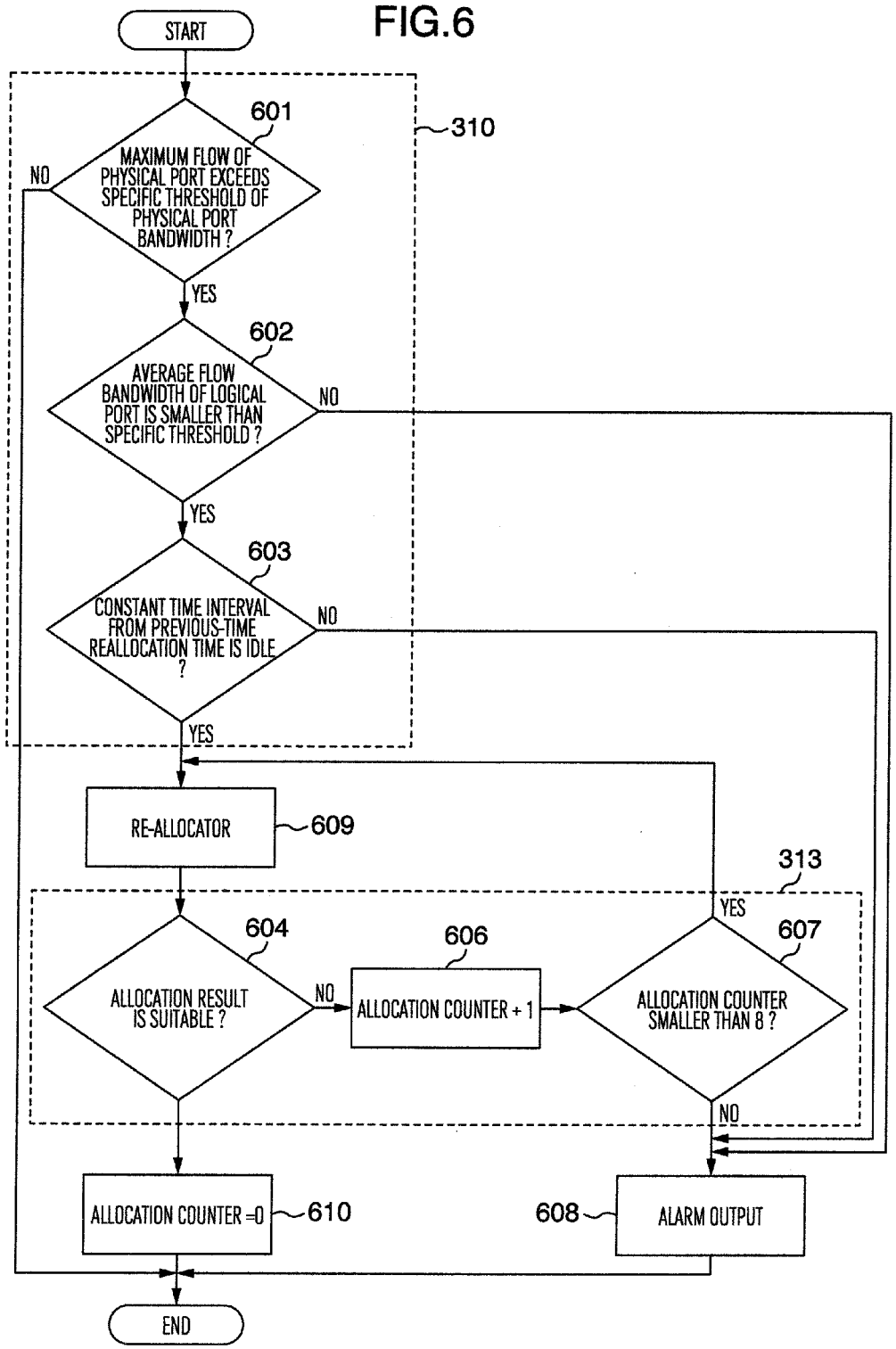
FIG. 6 is a flow chart for explaining operations of a allocation execution determiner and a allocation result determiner in FIG. 3.

Explanation will then be made as to the operation of the two-step packet allocation method. FIG. 6 is a flow chart for explaining the operations of the allocation execution determiner 310 and the allocation result determiner 313 in FIG. 3.

The allocation execution determiner 310 monitors information in the memory 309 at all times, and confirms whether or not a total maximum flow bandwidth in a packet output physical port exceeds a specific threshold previously set by the operator (step 601). When the total maximum flow bandwidth exceeds the specific threshold, the allocation execution determiner goes to a step 602. When the total maximum flow bandwidth does not exceed the specific threshold, the allocation execution determiner determines that allocation execution is unnecessary and terminates its processing operation.

The allocation execution determiner 310 confirms whether or not the total average flow bandwidth within the logical port exceeds the specific threshold previously set by the operator on the basis of the information of the memory 309 (step 602). In the present embodiment, the allocation execution determiner refers to the individual logical-port-number table 501 and confirms the value of the maximum flow bandwidth of "620 Mbps" for the logical port number of "total 1". When the total average flow bandwidth does not exceed the specific threshold, the allocation execution determiner goes to the next step 603. When the total average flow bandwidth exceeds the specific threshold, the allocation execution determiner determines the allocation execution is impossible and outputs an alarm (step 608).

The allocation execution determiner 310 confirms whether or not a constant time interval previously set by the operator from the previous-time allocation execution is idle (step 603). When the constant time interval is idle, the allocation execution determiner goes to an allocating step 609. When the constant time interval is not idle, the allocation execution determiner determines that the allocation execution is impossible and outputs an alarm (step 608). In this connection, the "constant time interval" is set at such a time as not overlapped with the information updating or rearrangement of the bandwidth monitor 308.

This is because, when the allocation frequently occurs in the constant time interval, this means that the transfer performance of the packet transfer apparatus cannot follow up the traffic and this may be required to add on its facilities. In such a condition, the frequent allocating operation results not only in no improvement of traffic bias but also in unstable traffic, possibly leading to generation of a packet loss. The time interval is considered to be set, for example, at 3 or 6 months.

The allocation result determiner 313 confirms on the basis of the information of the memory 309 whether or not a result allocated in the allocator 311 is correct (step 604).

The correct determining method means the a total maximum flow bandwidth is calculated for each of output ports newly allocated with use of the VLAN identifier and the maximum flow bandwidth of the output port and its calculation result does not exceed a specific threshold of the physical port bandwidth previously set by the operator. In the present embodiment, the allocation result determiner refers to the individual port total table 502 and confirms the value of the maximum flow bandwidth of "350 Mbps" for the output port number of "1". Determination as correct causes the allocation result determiner to go to a step 605 and writes "0" in the allocation counter for initialization (step 610). Determination as not correct causes the allocation result determiner to add "1" in the allocation counter (step 606) and to go to a step 607.

The allocation result determiner 313 confirms whether or not to continuously execute the allocation (step 607). When the count of the allocation counter is smaller than "8", the allocation result determiner again goes to an allocating step 609 because the allocation execution is valid. When the allocation counter is at "8", the allocation result determiner determines that the allocation execution is impossible and outputs an alarm (step 608).

Figure 7:
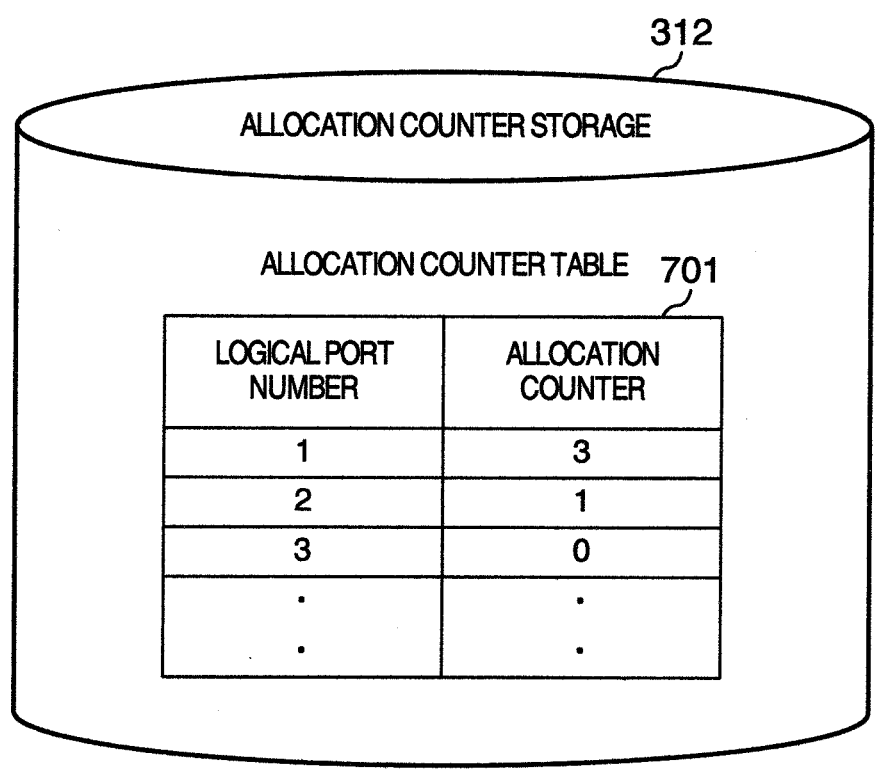
FIG. 7 shows an example of a data structure of an allocation counter storage in FIG. 3.

Explanation will next be made as to the data structure of the allocation counter storage 312. FIG. 7 shows an example of the data structure of the allocation counter storage 312. In FIG. 7, the allocation counter storage 312 has a logical port number and an allocation counter (table 701). The logical port number is read and recorded as the number of the logical port determined by the allocation execution determiner 310 to execute the allocation. The allocation counter has a value of the allocation counter which is associated with the logical port number and which is used to determine an allocating method to be executed by the allocator 311. The allocation counter has an initial value of "0", and the value of the counter is added by "1" and when the allocation result determiner 313 determines that the allocating method after the allocation is not correct, the value is written in the counter value.

Figure 8:
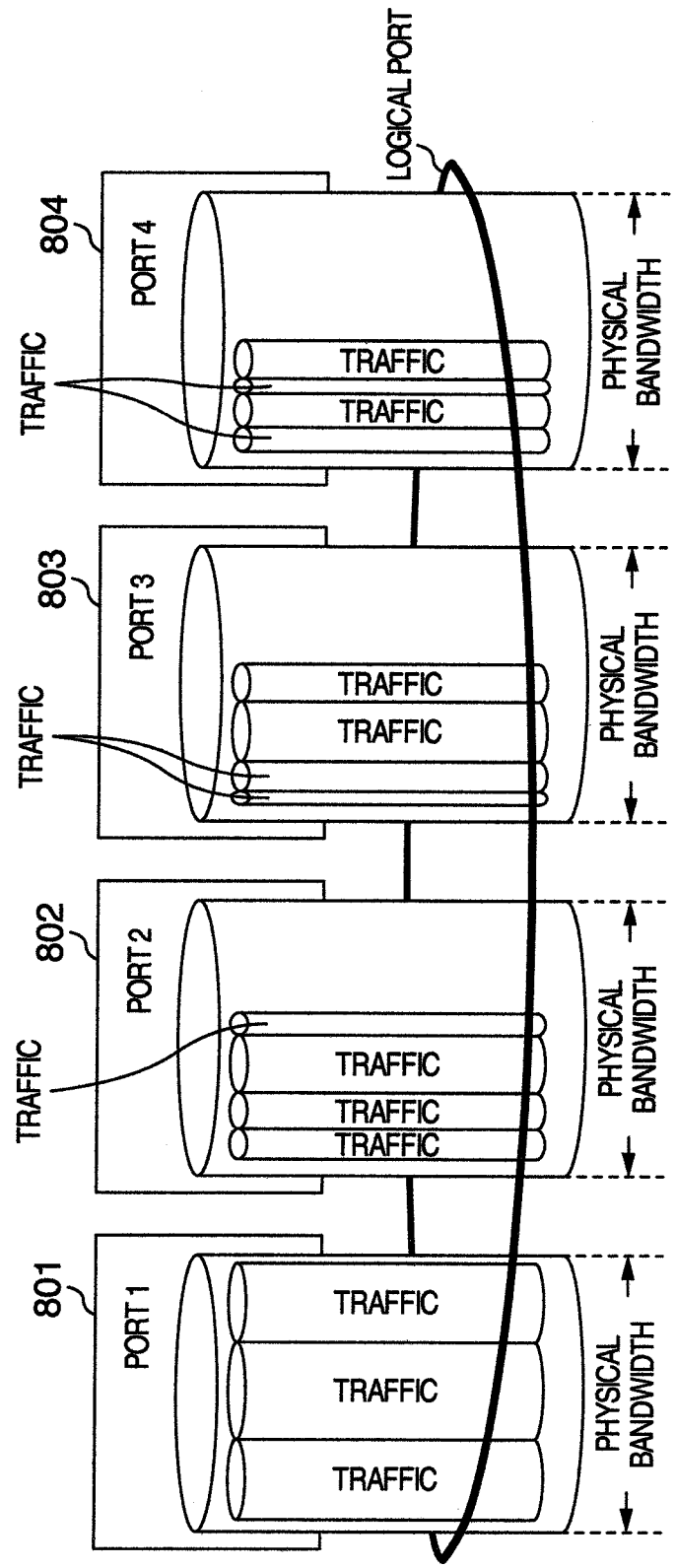
FIG. 8 shows a structure of a logical port for packet transfer when a bias is generated in the embodiment of the invention.

The allocating method of the allocator 311 will be explained. FIG. 8 shows an arrangement of one logical port when a bias occurs in the allocation before the present invention is applied. FIG. 9 shows an example of the data structure when an allocating method to be executed by the allocator 311 is stored therein. This data may be stored in the memory 309. In the present embodiment, when traffics flow through physical ports 1, 2, 3, 4 (801, 802, 803, 804), a result after the allocating method set in the allocator 311 is applied to 15 of the traffics numbered sequentially from number "1" in a descending order of average flow bandwidths held in the memory 309 is shown in an allocating method 901.

Assume that one of physical ports in a logical port has a smallest number x and another of the physical ports has a largest number y. That is, assume in the present invention that the port 1 is x and the port 4 is y. In the allocating method 901, in the case of the allocation counter "0", traffic allocation starts with the port x and ends in the port y, and allocation is repetitively made to the ports one by one sequentially toward a larger port number.

In the allocating method 901, in the case of the allocation counter "1", traffic allocation starts with the port x and ends in the port y, traffic allocation is repetitively made to the ports one by one sequentially toward a larger port number. In the second round, thereafter, traffic allocation starts with the port y and ends in the port x and allocation is made to the ports one by one sequentially toward a smaller port number. Such a sequence is repeated.

In the allocating method 901, in the case of the allocation counter "2", traffic allocation starts with the port x and ends in the port y and allocation is made to the ports one by one sequentially toward a larger port number in the first round. In the second and subsequent rounds, traffic allocation starts with the port (x+1), (x+2), . . . , (y−1), and y and ends in the port x, (x+1), . . . , (y−2), and (y−1) and traffic allocation is made to the ports one by one sequentially a larger port number, in the respective rounds. At this stage, the allocation returns to the port x and allocation is made one by one to the last port. Such a step is repeated.

In the allocating method 901, in the case of the allocation counter "3", traffic allocation starts with the port x and ends in the port y, and the allocation is made to the ports on every two basis sequentially toward a larger port number. Such a step is repeated.

In the allocating method 901, in the case of the allocation counter "4", traffic allocation starts with the port x and ends in the port (y−1), and the allocation is made to the ports one by one sequentially toward a larger port number. Thereafter, in order to put a bias to the port y, two traffics are allocated to the port y. Such a step is repeated.

In the allocating method 901, in the cases of the allocation counters "5", "6" and "7", the bias of the allocation counter "4" is put to the ports (y−1), (y−2) and (y−3) respectively and the allocation is made in a similar manner to the above.

Figure 10:
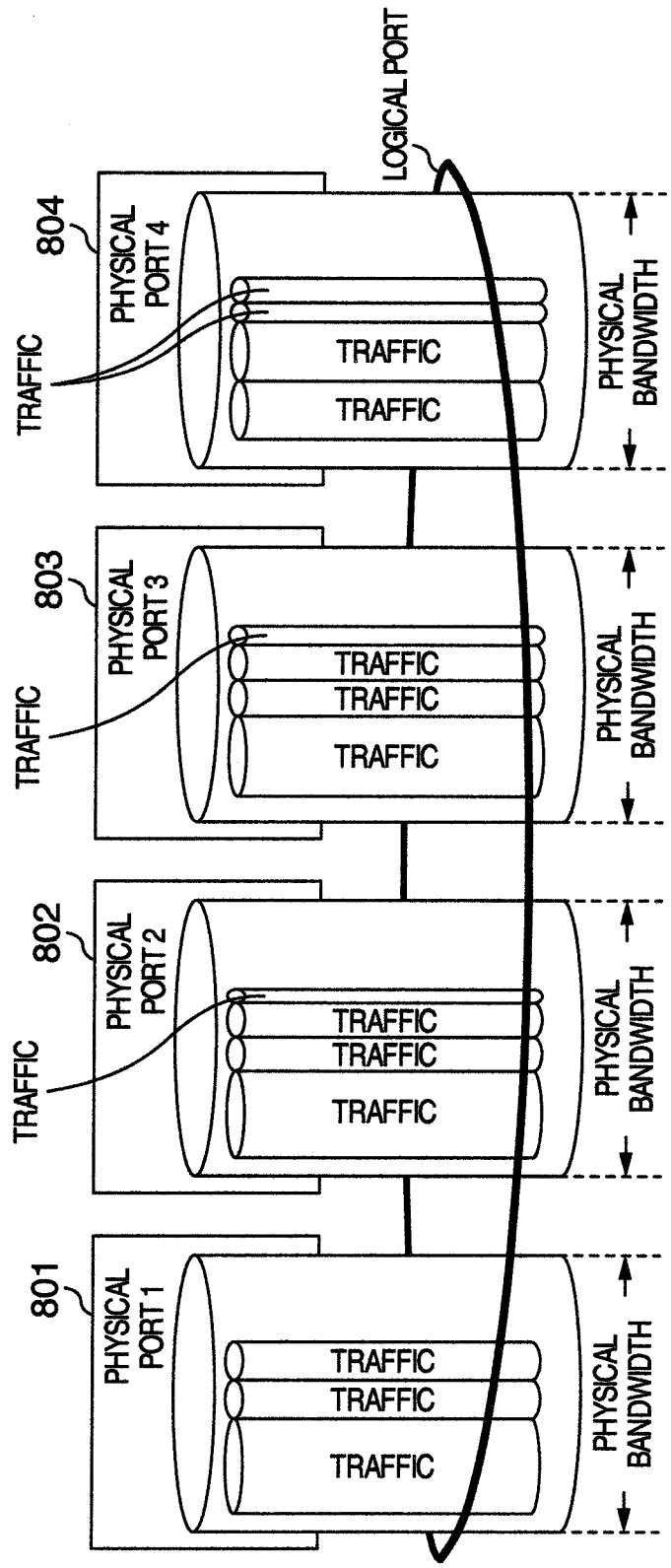
FIG. 10 shows an arrangement of the logical port for packet transfer after the allocation execution of the embodiment of the invention.

FIG. 10 shows an arrangement of one logical port when the present invention is applied to FIG. 8. In the present embodiment, the result of FIG. 10 shows that packets are uniformly allocated to the ports 1, 2, 3 and 4 in an averaged manner as a whole.

In this way, in the present embodiment, flow bandwidths for actual traffics are reflected. Thus, when a bias takes place in the flow bandwidths allocated to physical ports of a logical port, there is found such a physical port that packets overflow, and the invention apparatus determines the necessity of reallocation of the packets; the apparatus allocates the packets in such a manner that traffics having large flow bandwidths are averagedly allocated. As a result, packet allocation averaged as a whole can be autonomously achieved, and the bandwidth of all the physical ports of the logical port can be effectively utilized, thus avoiding packet discard.

It should be further understood by those skilled in the art that although the foregoing description has been made on embodiments of the invention, the invention is not limited thereto and various changes and modifications may be made without departing from the spirit of the invention and the scope of the appended claims.

The invention claimed:

1. A network transfer apparatus comprising:
a bandwidth monitor for monitoring traffics for each of physical ports of the network transfer apparatus combined into a logical port;
an allocation execution determiner for determining whether or not the monitored traffics exceeds a predetermined threshold for the bandwidths of the physical ports;
a division executor for again allocating the traffics of the physical ports in the logical port; and
an allocation result determiner for determining whether or not the traffics of each of the physical ports after allocated by the division executor, is smaller than the predetermined threshold,
wherein the allocation execution determiner determines whether or not the monitored traffics is larger than the predetermined threshold in such a manner that, when the monitored traffics is larger than the predetermined threshold, the division executor allocates the monitored traffics, and when the allocation result determiner determines that the traffics of the physical ports after the allocation exceeds the predetermined threshold, the division executor again allocates the traffics;
wherein a plurality of VLANs are accommodated in the logical port, and allocation of traffics of the physical ports in the logical port is made for each of he VLANs;
wherein ones of the traffics of the physical ports in the logical port which have bandwidth flows of a constant or more values selected based on a predetermined judgment criterion, are allocated; and
wherein the predetermined judgment criterion specifies that average bandwidth flows of the traffics are sequentially added together in a descending order of bandwidth flows and when a sum of the average bandwidth flows exceeds a constant percentage of a sum of the bandwidth flows of the traffics flowing through the logical port, the traffics are selected as an allocation target.

2. An network transfer apparatus according to claim 1, wherein the predetermined judgment criterion specifies that only a predetermined number of ones of the traffics in a descending order of bandwidth flows are selected as an allocation target.

3. A network transfer apparatus according to claim 1, wherein the apparatus includes a memory for storing therein a first identifier for uniquely identifying the logical port, a second identifier for uniquely identifying the traffic, a third identifier of the physical port allocated to the traffic, and an average flow of the traffic associated with the first and second identifiers, and wherein the apparatus performs allocating operation over the traffics of the physical ports in the logical port by referring to the memory.

4. A network transfer method comprising:
monitoring traffics of each of a plurality of physical ports in the network transfer apparatus in a logical port obtained by logically combining the physical ports;
determining whether or not the monitored traffics exceed a predetermined threshold for a bandwidth of the physical ports;
again allocating the traffics of the physical ports in the logical port; and
determining whether or not the traffics of the physical port after allocation of the division executor, is smaller than the predetermined threshold,
wherein it is determined whether or not the monitored traffics exceed the predetermined threshold, and when the monitored traffics exceed the predetermined threshold, the monitored traffics are allocated, and when it is determined that the traffics of the physical port after the allocation exceeds the predetermined threshold, reallocation is carried out;
wherein a plurality of VLANs are accommodated in the logical port, and allocation of the traffics of the physical ports in the logical port is carried out on each VLAN basis;
wherein ones of the traffics of the physical ports in the logical port which have bandwidth flows of a constant or more values selected based on a predetermined judgment criterion are allocated; and
wherein the predetermined judgment criterion specifies that average bandwidth flows of the traffics are sequentially added together in a descending order of bandwidth flows and when a sum of the average bandwidth flows exceeds a constant percentage of a sum of the bandwidth flows of the traffics flowing through the logical port, the traffics are selected as an allocation target.

5. A network transfer method according to claim 4, wherein the predetermined judgment criterion specifies that only a predetermined number of ones of the traffics in a descending order of bandwidth flows are selected as an allocation target.

6. A network transfer method according to claim 4, wherein the system further includes a memory for storing therein a first identifier for uniquely identifying the logical port, a second identifier for uniquely identifying the traffic, a third identifier of the physical port allocated to the traffic, and an average flow of the traffic associated with the first and second identifiers, and wherein the system performs allocating operation over the traffics of the physical ports in the logical port by referring to the memory information.

* * * * *